United States Patent
Brown et al.

[11] Patent Number: 5,888,015
[45] Date of Patent: Mar. 30, 1999

[54] WEDGE LOCK ROD GRIPPER

[76] Inventors: Kris H. Brown, 331; Kelly A. Brown, 601 N. Plum, both of Eureka, Kans. 67045; David N. Sherman, P.O. Box 109, Hamilton, Kans. 66853

[21] Appl. No.: 796,020

[22] Filed: Feb. 5, 1997

[51] Int. Cl.⁶ .................................................. B25G 3/00
[52] U.S. Cl. .................... 403/379.1; 403/374.1; 403/409.1; 403/DIG. 9; 403/378
[58] Field of Search .................. 403/373, 374.1, 403/378, 379.1, DIG. 9, DIG. 4, 409.1, 256

[56] References Cited

U.S. PATENT DOCUMENTS

| | | | |
|---|---|---|---|
| 919,542 | 4/1909 | Dain | 403/370 X |
| 1,880,894 | 10/1932 | Dorman | 403/374 X |
| 3,957,381 | 5/1976 | Schafer | 403/374 X |
| 3,972,635 | 8/1976 | Peter et al. | 403/13 |
| 4,171,822 | 10/1979 | Thun | 403/379 X |
| 4,354,399 | 10/1982 | Katayama | 403/373 X |
| 4,372,703 | 2/1983 | Szostak | 403/378 X |
| 4,523,338 | 6/1985 | May | 403/378 X |
| 4,529,332 | 7/1985 | Glabiszewski | 403/374 X |
| 4,579,477 | 4/1986 | Hartman | 403/379 X |
| 4,772,153 | 9/1988 | Huang | 403/373 X |
| 5,059,053 | 10/1991 | Rose | 403/373 X |
| 5,452,529 | 9/1995 | Neuenfeldt et al. | 403/374 X |
| 5,536,102 | 7/1996 | Kao | 403/DIG. 9 |
| 5,609,436 | 3/1997 | Jou | 403/DIG. 9 |

*Primary Examiner*—Donald P. Walsh
*Assistant Examiner*—Emmanuel M. Marcelo
*Attorney, Agent, or Firm*—Bradley P. Sylvester

[57] ABSTRACT

A rod gripping device, having a support member with a locking pin hole and a rod receiving hole, where the bores of each hole are situated perpendicular to each other, but parallel to a given plane that bisects the support, and where the bores of the holes intersect to form a common area shared by both bores. When a rod is inserted into the rod receiving bore, so that the rod occupies the common area shared by the bores, a set of angled wedges are situated on either side of the rod, with the wedges being located in the locking pin hole bore. A first wedge has a smooth bore through it, with the second wedge having a threaded bore. A locking pin is inserted through the first smooth bore wedge, which can slide along the shaft of the locking pin to the locking pin handle edge, with the second threaded bore wedge receiving the locking pin's threaded shaft portion. When the locking pin is rotated, the second threaded bore wedge moves towards the first smooth bore wedge, until the wedges are prevented from moving together by the rod portion in the common area. The wedges press against the rod, with the angled sides forcing the rod upward within the bore it occupies to create three points of friction, being that between the rod and the rod bore and that between each of the wedges.

1 Claim, 2 Drawing Sheets

WEDGE LOCK ROD GRIPPER

BACKGROUND OF THE INVENTION

This invention relates to a means by which a solid cylindrical rod can be firmly held and positioned, using a single bolt and one or more tapered bushings/wedges. This invention is useful to fix the positions of guide rods, that are used with machinery, where the guide rods force cardboard sheets in position during the box manufacturing process.

Prior art failed to address the needs of current equipment adequately, in that when solid cylindrical rods were positioned, it was due to a tightening sleeve or bolt end that impacted directly against the side of the cylindrical rod. Such methods proved unstable, and either allowed the rod to move from its desired settings, or required undue effort to adjust the position of the cylindrical rod.

Examples of prior art are seen in U.S. Pat. No. 2,846,248 (Kilwer), in which an arrangement for attachments comprising a bolt and tapered bushings were used, where the tapered bushings and bolt were received through provided tapered openings. The tapered bushings impacted against the sides of the tapered openings, to keep the coupling secured. This invention does not address the problems involved with a solid cylindrical rod, having no such tapered openings provided.

Another example of a pin securing means is shown in U.S. Pat. No. 3,258,283 (Winberg et al.) and U.S. Pat. No. 3,301,581 Continuation in Part (Womberg). These patents describe a non-threaded tool joint construction for a high torque drilling shaft, involving a cylindrical pin which urges a cone into a tapered opening that has a bore directly through the coupling pieces, with the bore of said hole extending from one side to the other. This invention does not have any ability to secure a solid cylindrical rod, unless said rod also has a bore through it.

A further example of prior art is shown in U.S. Pat. No. 3,851,982 (See), in which an attaching means was described, which had the benefits of being resilient to shock and vibration. In this invention, a bolt having tapered sleeves was inserted through receiving holes, which went through a support member and a mounting portion. The tapered sleeves moved into position, as the bolt was tightened, with the tapered sleeves fitting against a corresponding surface shape. While this invention had advantages for mounting items on the tops of vehicles, it did not address the problems associated with securing solid cylindrical rods.

An example of efforts to secure a solid metallic rod is shown in U.S. Pat. No. 4,171,822 (Thun), in which a bicycle crank was fitted together using a shaft with a tapered flattened end, being engaged by a key, whose flattened surface pressed against the shaft's flattened end. As a nut was tightened, the flat areas pressed together, so that the shaft was fixed in position, allowing a stable crank. While this patent dealt with the fixing of solid metal shafts, it remained necessary for the shaft to have a specifically flat shaped end portion. The shaft was unable to be fixed at any other point along its length.

Existing methods of gripping rods generally comprise a split sleeve, that when compressed around a rod, grips the rod and holds it in position. There is a large amount of force required to grip the rod properly, and the split sleeves have a limited usable life before they fail to operate properly. Methods to attempt to overcome the drawbacks of these split sleeves, have included a key protrusion that extends outward from a rod, and fits within a channel located in the sleeve. This allows the rod to maintain position as to rotation, with the split sleeve gripping along the rod's length. The same problems, however, plague the split sleeve, when used in this manner, necessitating an apparatus that has a longer usable life, and can be used with smooth cylindrical rods, and those with key protrusions.

SUMMARY OF THE INVENTION

This invention relates to a rod holding and gripping device, that allows rigid rods to be easily adjusted to a firmly fixed position or orientation. This invention allows a variety of rod shapes to be used, but it is particularly useful with solid cylindrical rods, with or without key protrusions that exhibit a continuous curved surface, with this invention able to grip the rod at any point along its length or circumference.

This invention is an improved apparatus that allows rigid rods to be firmly positioned, with the gripping force of the apparatus able to withstand substantial twisting force applied against the rod, as well as preventing the rod from sliding along its length. Such use is necessary during various manufacturing processes, where rigid rods are used as guides for products being manufactured using an assembly line process, where the guide rods require periodic position adjustment, and where the guide rods are subject to forces that urge the guide rods to twist and move from desired position settings. An example of this type of use is found in the assembly line process of forming cardboard sheets into boxes.

When cardboard sheets are formed into boxes, the guide rods must be positioned with sufficient rigidity, so that they are able to withstand stress associated with the manipulation of the cardboard sheets during the folding and guiding process of box manufacturing. During the box manufacturing process, there often arises the need to make adjustments to the position of guide rods, to improve the efficiency of the box making process, or to allow various sizes of boxes to be made. This rod gripping apparatus allows the user to make quick adjustments to a rod, allowing the rod to be repositioned as necessary, with the apparatus able to grip the rod at any desired point along its length, or at any point of circumference with sufficient pressure, so that the rod position is fixed and resists movement caused by stress associated with the box manufacturing process.

This apparatus comprises a support that is constructed out of a resilient material, that provides a rod hole which is able to receive a rod, and which is used to provide a means to grip the rod when the rod is situated within said rod hole. The rod hole has a circular bore that extends through the support. A rod axis extends through the length of the rod hole bore along its center point. Perpendicular to the rod axis is a locking pin hole, that has circular bore which extends through the support. The locking pin hole bore has an axis that extends through its central point along the length of the bore, with the rod axis and locking pin axis being on different parallel planes so that they do not overlap, but are situated perpendicular to each other.

The means to grip the rod is comprised of a set of bushing/wedges, which have an angled round or flat surface that engage the rod at two different points along the rod's circumference, with the wedges able to apply sufficient pressure against the rod, urging the rod against the sides of the rod hole bore, so that the friction caused by the wedges against the rod, and the resulting friction of the rod against the bore side is greater than forces applied against the rod, which would ordinarily cause the rod to rotate or slide within the rod hole.

The wedges have a circular shaped circumference, being of a shape and size, that closely matches that of the locking pin hole. The locking pin hole defines a shaft with a circumferential bore that is slightly greater than the circumference of the wedges. The wedges are able to slide within the locking pin hole bore, and are able to rotate around the locking pin axis, but cannot turn perpendicular in relation to the locking pin axis.

The space defined by the bore of the rod hole and the bore of the locking pin hole slightly overlap at their point of intersection, so that a common shared area is defined. When a rod is thus situated within the rod hole, a portion of the rod will protrude into this common area, but will not prevent the insertion of the locking pin shaft through the locking pin hole bore. When the wedges are moved within the locking pin bore, they will also protrude within this common area. The rod and wedges cannot share the same portion of space within the common area at the same time, due to the fact that both the rod and the wedges are constructed out of sturdy resilient material, generally being a metallic substance that resists degradation of shape, such as steel.

To use this apparatus, a rod is slid into the rod hole, with the length of the rod extended within the bore of the rod hole, so that it occupies a portion of the common area shared by the rod hole bore and the locking pin hole bore. A first and second wedge are positioned within the locking pin hole bore, so that each wedge is able to contact one side of the rod portion that is situated within the common area shared by both hole bores.

A locking pin is inserted through a first wedge, which is able to slide along the length of the locking pin shaft, with the threaded end portion of the locking pin shaft engaging the second wedge. The second wedge has a threaded bore, which receives the locking pin threaded shaft, so that as the locking pin is rotated, the second wedge moves along the threaded end toward the rod in the common area of the hole bores.

As the second wedge moves toward the locking pin handle and first wedge, it contacts the rod. The locking pin will continue to urge the second wedge toward the first wedge, as the locking pin rotates. The first wedge can only move backward along the shaft, until it contacts the locking pin handle edge, and being unable to move backwards any farther, will contact the rod as the second wedge moves towards the first wedge, decreasing the distance between them, until further movement toward each other is prevented by the rod.

When both wedges contact the rod, and as the locking pin shaft continues to rotate, the second wedge will exert a linear force against the rod, which will be countered by an equal amount of diametrically opposed force applied by the first wedge against the other side of the rod. The point of contact that both wedges make against the rod is on their angled flat sides, or angled curved surface. The angled surfaces of the wedges also urge the rod upward against the rod bore side wall. These three points of friction contact against the rod, being the second wedge, the first wedge, and the rod bore side wall, can be raised to sufficient levels to allow the rod to be firmly positioned in relation to the support.

The wedges used may have a conical curved point of contact with the rod, or a flat side that contacts the rod. While the conical curved point provides less area of physical contact with the rod, this is not significant with regard to the wedge's ability to grip the rod, since the area of contact and point of friction that the rod makes against the rod bore side wall is far greater than the area of contact between the rod and both wedges. Therefore, the wedges used may be either conical curved surfaces, or flat angled surfaces. These different types of wedges may be used with identical shaped wedges, or, in combination with each of the different types of wedges.

BRIEF DESCRIPTION OF THE DRAWINGS

FIG. 2A depicts a perspective view of an flat side wedge having a smooth unthreaded bore.

DESCRIPTION OF THE PREFERRED EMBODIMENT

This invention relates to an apparatus that is useful to hold a rod in a fixed position, where the rod is resistant to any movement, and where the apparatus is easily adjustable to reposition the rod, or having a fixed rod, to adjust a position an apparatus in relation to the fixed rod.

Figure 1:
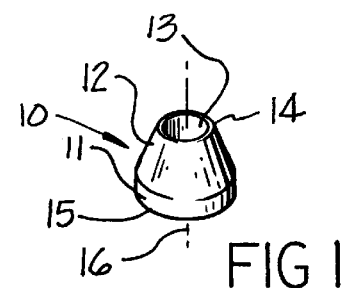
FIG. 1 depicts a perspective view of a conical wedge having a smooth unthreaded bore.

Referring to FIG. 1, a bushing, being a aconical wedge (conical wedge) 10 is shown, having a curved side edge 11. The curved side edge 11 is cylindrical, and has a width extending from the bottom end 15 toward the front end 14. The curved side edge 11 is adjacent to an angled curved surface 12, where the curved surface 12 decreases in circumference along its length toward the front end 14. The conical wedge 10 has a bore 13, which extends through the conical wedge 10 from the front end 14, to the bottom end 15, with said bore 13 having a circumference along its length around a center point axis 16.

Figure 2:
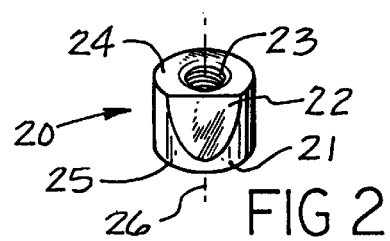
FIG. 2 depicts a perspective view of a flat side wedge having a threaded bore.

Referring to FIG. 2, a bushing with a flat angled surface and threaded bore (threaded flat side wedge) 20 is shown, having a curved side edge 21. The curved side edge 21 is cylindrical, and extends from the bottom end 25 to the front end 24. The threaded flat side wedge 20 has a flat angled surface 22, which extends from the circumference of the curved side edge 21 and is angled toward the center point axis 26. The angled surface 22 occupies a plane that extends through the extreme radial distance from the center point of the wedge 20 along the circumference of the wedge's curved side edge 21, and through a radial point closer to the center point axis 26, at the front end 24. The threaded flat side wedge 20 has a threaded bore 23, which extends through the threaded flat side wedge 20, having a circumference along its length around a center point axis 26. The flat angled surface 22 is angled so that its outer surface approaches but does not breach the threaded bore 23.

Referring to FIG. 2A, a bushing having a flat side and unthreaded bore (unthreaded flat side wedge) 20' is shown, having a curved side edge 21'. The curved side edge 21' is cylindrical, and extends from the bottom end 25' to the front end 24'. The unthreaded flat side wedge 20' has a flat angled surface 22', which extends from the circumference of the curved side edge 21' and is angled toward the center point axis 26'. The angled surface 22' occupies a plane that extends through the extreme radial distance from the center point of the wedge 20' along the circumference of the wedge's curved side edge 21', and through a radial point closer to the center point axis 26', at the front end 24'. The unthreaded flat side wedge 20' has a smooth wall bore 23', which extends through the unthreaded flat side wedge 20', having a circumference along its length around a center point axis 26'. The flat angled surface 22' is angled so that its outer surface approaches but does not breach the smooth wall bore 23'.

Figure 5:
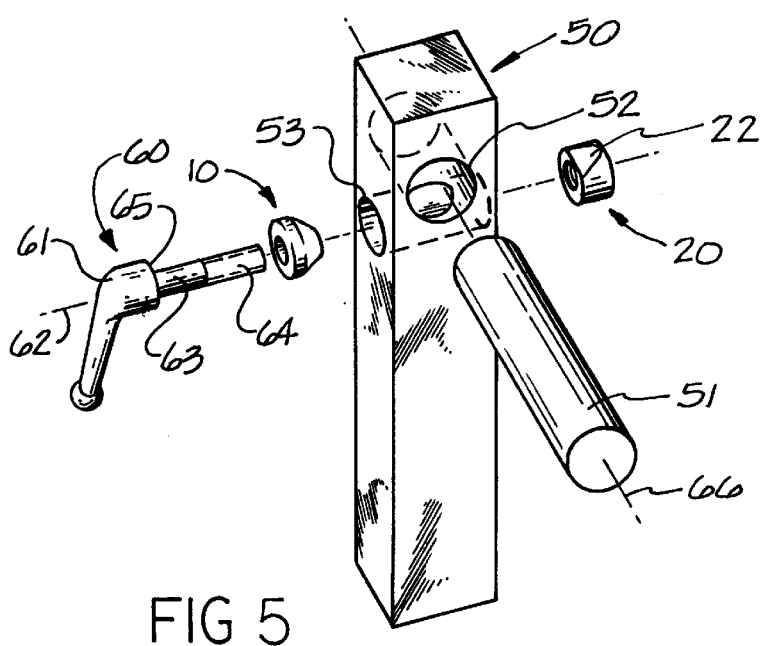
FIG. 5 depicts an exploded perspective view of the rod gripping apparatus.

Referring to FIG. 5, an exploded view of the apparatus is shown. A support 50, is formed of a generally rigid material, such as steel or iron, having a shape that allows a rod hole 52 and a locking pin hole 53 with bores that can extend through the support 50. In FIG. 5, the support 50 has a rectangular shape, with a square cross sectional area. While this is the simplest shape to use for purposes of demonstrating the orientation of the rod hole 52, and locking pin hole 53, the support 50 may have other configurations and cross sectional shapes, as long as the support 50 exhibits sufficient dimensions of height, width and length, to allow the said holes 52 and 53 to have bores situated perpendicular to each other, but parallel to a single plane as described in greater detail below.

Rod hole 52 defines a bore that extends into the support 50, with the hole 52 bore able to receive a rod 51. The rod 51 is preferably of a rigid material, such as iron or steel. The circumference of said hole 52 and its bore, preferably radiates around a central rod axis 55. While FIG. 5 depicts a rod 51 having an apparent circular cross section, with hole 52 having a corresponding shape, the rod 51 used may have alternate cross sectional shapes, as long as the hole 52 and its bore have a corresponding shape that allows the rod 51 to slide along its length within the bore of hole 52.

The bore of rod hole 52 may extend all of the way through the support, or terminate at a back wall, so that the bore only defines a cup shaped depression that is able to accept a certain length of rod 51. FIG. 5 shows the bore of rod hole 52 extending all the way through support 50, which allows rod 51 to be positioned within the support as to a rotational setting as well as a lengthwise setting. This is the optimal configuration for the use of this invention, since rod 51 can be positioned in the support at any point along its length.

A second hole, being a locking pin hole 53, defines a bore that extends through support 50, and is perpendicular to the rod axis 55 of the bore of rod hole 52. The bore of the locking pin hole 53 is preferably circular, with a circumferential edge radiating around a locking pin axis 62. The locking pin axis 62 is located on a plane that is parallel to that of the rod axis 55, with axis 62 and 55 oriented so that they are perpendicular to each other. The bore of the locking pin hole 53 has a sufficient circumference and shape so as to receive the conical wedge 10 so that the curved side edge 11, or flat angled surface 22 or 22' has sufficient room to slide along the length of the bore of locking pin hole 53 and rotate around the locking pin axis 62, but is restricted by the bore of locking pin hole 53 so that the front end 14, or 14' and the back end 15 or 15' are unable to rotate in relation to each other.

The locking pin hole 53 has a sufficient circumference and shape so as to receive the flat side wedge 20 or 20', so that the curved side edge 21 or 21' has sufficient room to slide along the length of the bore of locking pin hole 53 and rotate around the locking pin axis 62, but is restricted by the bore of locking pin hole 53 so that the front end 24, or 24' and the back end 25 or 25' are unable to rotate in relation to each other.

The bore of rod hole 52 and the bore locking pin hole 53 each radiate around their respective axis 55 and 62, where said axis 55 and 62 are on separate horizontal planes with one of the horizontal planes situated directly above the other plane, so they do not intersect. The first horizontal plane is defined by a plane that is situated so that it occupies a cross sectional area of the support 50, and is located on the line defined by the rod axis 66, with the first horizontal plane above a second parallel horizontal plane defined by a plane that is situated so that it occupies a cross sectional area of the support 50, and is located on the line defined by the locking pin axis 62. The horizontal planes are located in close enough proximity so that the area of rod bore 52 must concurrently occupy part of the area of the locking pin bore 53. A portion of the bore of rod hole 52 and a portion of the bore of locking pin hole 53 intersect and define a common area 54, which is jointly shared by the bore of rod hole 52 and locking pin hole 53. A rod 51, when properly positioned within the bore of rod hole 52, will occupy the common area 54, also being a portion of the bore of locking pin hole 53.

Figure 3:
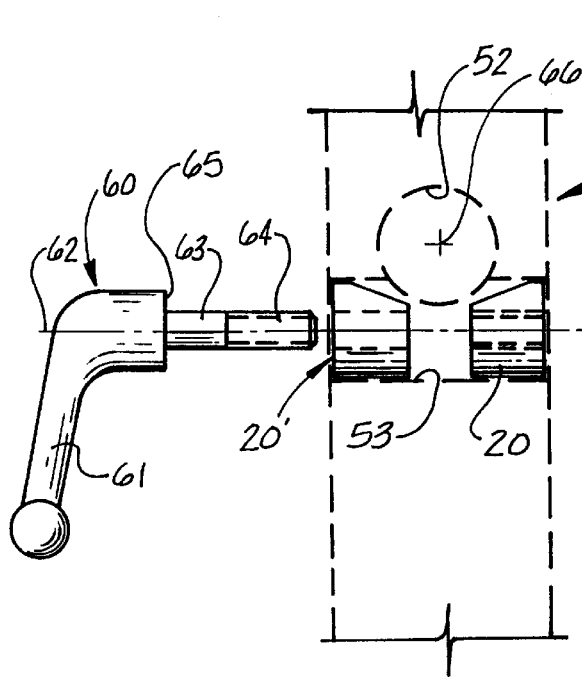
FIG. 3 depicts a side cross sectional view of the rod gripping apparatus, having an unthreaded flat side wedge and an threaded flat side wedge, with the locking pin shown positioned to the side of the apparatus.
Figure 4:
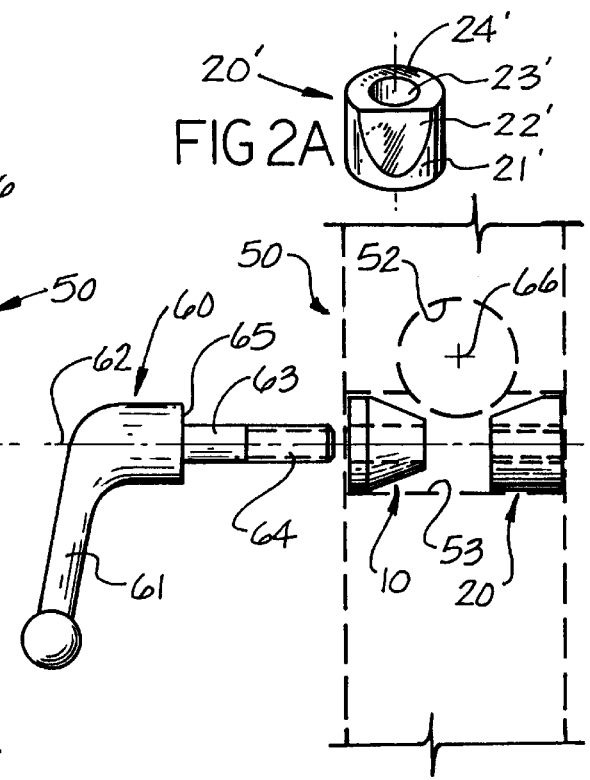
FIG. 4 depicts a side cross sectional view of the rod gripping apparatus, having an unthreaded conical wedge and a threaded flat side wedge, with the locking pin shown positioned to the side of the apparatus.

Referring also to FIGS. 3, 4 and 5, the common area 54, as occupied by rod 51 is depicted, showing a cross sectional view of the rod, and a lengthwise cross sectional view of the bore of locking pin hole 53. The common area 54 occupied by rod 51, does not include the area occupied by the locking pin shaft 63 and threaded end 64, when it is inserted into locking pin hole 53. In this manner, a rod 51 occupying the common area 54, will not intrude into the area that would be occupied by locking pin shaft 63, when it is inserted into locking pin hole 53, and positioned in a threaded flat side wedge 20.

The locking pin 60, comprises a handle 61, which has a handle edge 65, having a circumference greater the unthreaded conical wedge bore 13, or the unthreaded flat side wedge bore 20'. The handle 61 is depicted as a perpendicular extension in FIGS. 3, 4 and 5. The handle 61 however, may simply be a bolt head or other similar shape, as long as force can be applied to rotate the shaft 63. Using the handle 61, as depicted, is a preferable method, since adjustments can be done manually without any types of tools required to rotate the shaft 63. The shaft 63 extends outward from the handle edge 65, having a smooth surface and a length of threaded portion defined by a threaded end 64, having raised spiraling threads common to bolts. The threaded end 64 may be received by the threaded bore 23 of the flat wedge 20, with the flat wedge acting as a "nut", so that when the threaded end 64 is turned while situated in said bore 23, the raised surface of the threaded end 64 engage reciprocal receiving ridges within the threaded bore 23, allowing the corresponding wedge 20 moves along the length of said threaded end 64.

The unthreaded conical wedge 10 and unthreaded flat side wedge 20' have bores 13 or 23' that define a circumference that allows them to slide along the locking pin threaded end 64 and locking pin shaft 63, until they contact the handle edge 65, which has a circumference greater than either bore 13 or 23'.

The bore of hole 52 should be only slightly larger than the rod 51 it is intended to receive. The tolerances between the larger bore of hole 52 and the slightly smaller circumference of rod 51 can be as precise as a ten thousandth of an inch or centimeter difference, to tolerances greater than a few hundredths of an inch that allow the rod 51 to easily move from side to side within hole 52.

OPERATION

Using Smooth Unthreaded Conical Wedge and Threaded Flat Side Wedge.

Referring again to FIG. 4 and 5, to grip a rod, using this apparatus, rod 51 is positioned into the bore of the rod hole 52, so that the rod 51 occupies the common area 54 shared by the bore of rod hole 52 and the bore of locking pin hole 53. A conical wedge 10 is positioned within the bore of locking pin hole 53, with its front end 14 toward the rod 51, with rod 51 preventing wedge 10 from moving any further into said bore of hole 53. A flat side wedge 20, having a threaded bore 23, is positioned within the bore of locking pin hole 53, on the other side of the rod 51, with the front end 24 of said wedge 20 positioned toward rod 51.

The threaded end 64 and shaft 63 of locking pin 62 is pushed through the unthreaded bore 13 of conical wedge 10, with the threaded end 64 engaging the threaded bore 23 of flat side wedge 20. As the handle 61 is turned, the threaded end 64 rotates, causing it to move along the length of threaded bore 23. As the threaded flat side wedge 20 moves along the threaded shaft 64 toward the handle end 65, it will contact rod 51 with its flat angled surface 22. As the threaded flat side wedge continues to move along the threaded end 64, it will decrease the available shaft length able to be occupied by the unthreaded conical wedge 10, with the side of rod 51 contacting the angled curved surface 12 of conical wedge 10, forcing the conical wedge 10 against the handle edge 65.

As the handle 61 is further tightened, the threaded flat edge wedge 20 will provide a linear force against the rod 51, with a similar but opposing linear force being applied by the resistance of the unthreaded conical wedge 10. The points of contact between wedges 10 and 20, and rod 51, are at angles that cause the rod 51 to move perpendicular to the linear force caused by the wedges 10 and 20, so that the rod 51 is forced against the rod bore inner sidewall 59. This creates three points of friction contact: being (a) at the point where the angled curved surface of conical wedge 10 and the rod 51 contact; (b) at the point where the flat angled surface 22 of the flat side wedge 20 and rod contact each other; and (c) where the rod 51 makes contact with the rod bore inner sidewall 59.

To readjust the position of the rod 51, the handle 61 is turned so that the wedge 20 is able to move along the threaded end 64 away from rod 51, allowing the pressure force on all points of friction to decrease. This allows the rod 51 to move freely within the bore of rod hole 52. A gradual or slight turning of handle 61 causing varying pressure created by wedge 20 against rod 51, will allow the rod 51 to be held in a particular position with a corresponding variable amount of rigidity. Manual operation of the handle 61 provides forces necessary to allow rod 51 to be firmly positioned, restricting movement from other torsional or pulling forces on the rod 51.

Using Smooth Unthreaded Flat Side Wedge and Threaded Flat Side Wedge.

Referring specifically to FIG. 3, and also to FIGS. 5, to grip a rod, using this apparatus, rod 51 is positioned into the bore of the rod hole 52, so that the rod 51 occupies the common area 54 shared by the bore of rod hole 52 and the bore of locking pin hole 53. A unthreaded flat side wedge 20' is positioned within the bore of locking pin hole 53, with its front end 24' toward the rod 51. A flat side wedge 20, having a threaded bore 23, is positioned within the bore of locking pin hole 53, on the other side of the rod 51, with the front end 24 of said wedge 20 positioned toward rod 51.

The threaded end 64 and shaft 63 of locking pin 62 is pushed through the unthreaded bore 23' of unthreaded flat side wedge 20', with the threaded end 64 engaging the threaded bore 23 of flat side wedge 20. As the handle 61 is turned, the threaded end 64 rotates, causing it to move along the length of threaded bore 23. As the threaded flat side wedge 20 moves along the threaded shaft 64 toward the handle end 65, it will contact rod 51 with its flat angled surface 22. As the threaded flat side wedge continues to move along the threaded end 64, it will decrease the available shaft length able to be occupied by the unthreaded flat side wedge 20', with the side of rod 51 contacting the flat surface 22' of unthreaded flat side wedge 20', forcing it against the handle edge 65.

As the handle 61 is farther tightened, the threaded flat edge wedge 20 will provide a linear force against the rod 51, with a similar but opposing linear force being applied by the resistance of the unthreaded flat side wedge 20'. The points of contact between wedges 20' and 20, and rod 51, are at angles that cause the rod 51 to move perpendicular to the linear force caused by the wedges 20' and 20, so that the rod 51 is forced against the rod bore inner sidewall 59. This creates three points of friction contact: being (a) at the point where the angled flat surface of the unthreaded flat side wedge 20' and the rod 51 contact; (b) at the point where the flat angled surface 22 of the flat side wedge 20 and rod contact each other; and (c) where the rod 51 makes contact with the rod bore inner sidewall 59.

To readjust the position of the rod 51, the handle 61 is turned so that the wedge 20 is able to move along the threaded end 64 away from rod 51, allowing the pressure force on all points of friction to decrease. This allows the rod 51 to move freely within the bore of rod hole 52. A gradual or slight turning of handle 61 causing varying pressure created by wedge 20 against rod 51, will allow the rod 51 to be held in a particular position with a corresponding variable amount of rigidity. Manual operation of the handle 61 provides forces necessary to allow rod 51 to be firmly positioned, restricting movement from other torsional or pulling forces on the rod 51.

The order of inserting the various objects into their respective holes 52 and 53 is inconsequential, as long as the rod 51 is able to be inserted into the bore of rod hole 52, so that it occupies common area 54, prior to being gripped by wedges 10 and 20, or 20' and 20. A non threaded wedge 10 or 20' must be located in the bore of locking pin hole 53, with the front end 14 or 24' of the respective wedge 10 or 20' toward the rod 51, with a threaded bore wedge 20 located within the bore of locking pin hole 53, so that the front end or 24 or the respective wedge or 20 is facing toward the rod 51. The locking pin 60 may be inserted through wedges 10 or 20' and 20, after they are already in the bore of the locking pin hole 53, or prior to their being placed into the locking pin hole 53. The rod 51 may likewise be inserted at any time, as long as the proper choice of wedges 10 and 20, or 20' and 20 are positioned on either side of the rod 51, so that when a rod 51 is placed into the bore of the rod hole 52, so that the rod 51 occupies a portion of the common area 54, the locking pin 60 can be rotated, urging the threaded flat side wedge 20 toward the other wedge, being either the conical wedge 10 or unthreaded flat side wedge 20', causing them to press against and grip the rod 51.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. An apparatus having a means to grip and position a cylindrical rod, comprising:

(A) a support defining a rod hole, defining a bore that is able to receive a rod; and a locking pin hole having a bore that is perpendicular to the rod hole bore; where the bores of said holes are on separate parallel horizontal planes, where part of the area of the rod hole bore and part of the area of the locking pin bore intersect to define a shared common area, so that when a rod of sufficient size is placed into the rod hole bore, the rod will occupy the shared common area;

(B) a conical wedge, having a front end and a rear end, defining an angled curved surface which decreases in circumference along the length of said conical wedge toward the front end, with the conical wedge defining a bore that extends through the conical wedge from the front end to the rear end, where said bore has sufficient circumference so that it is able to receive and slide along the shaft and threaded end of the locking pin;

(C) a threaded flat side wedge, having a front end and a bottom end, defining a flat angled surface along a plane that extends through the outer circumference of the wedge and through a radial point closer to the center point axis at the front end, where said center point axis defines the central point of a threaded bore that extends from the rear end to the front end, where said threaded bore has reciprocal threading that is able to receive the threaded end of a locking pin;

(D) a locking pin, having a handle edge, and a shaft with a threaded end, said locking pin is inserted through the bore of said conical wedge, with the threaded end received by the threaded bore of the threaded flat side wedge, allowing the locking pin shaft, conical wedge and threaded flat side wedge to be placed into the bore of the locking pin hole, so that a portion of the space between the wedges comprises the common area and rod in the common area, so that when a rod is placed into the support's rod hole bore, occupying the common area, the locking pin can be rotated, urging the threaded flat side wedge toward the conical wedge, causing said wedges to press against and grip die rod.

* * * * *